Nov. 1, 1932.  R. T. GRIFFITHS  1,885,344
FOUNTAIN PEN
Filed Aug. 21, 1930
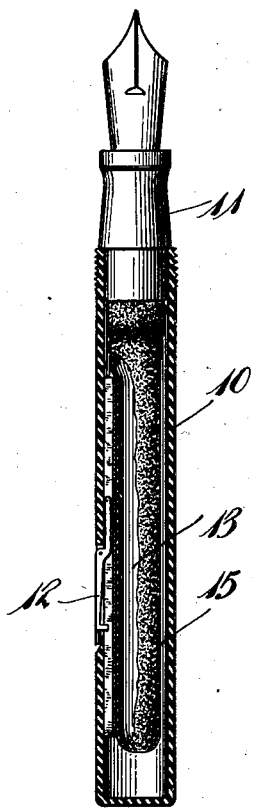
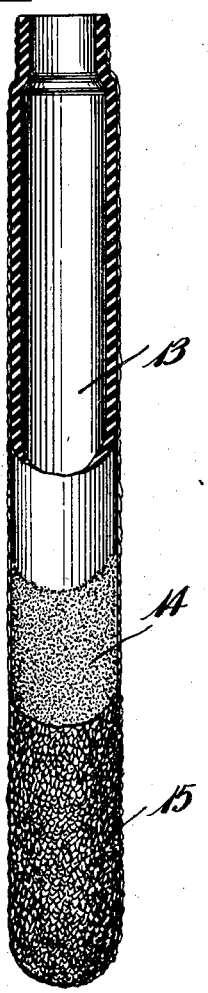
Inventor
Richard T. Griffiths
By
Attys Patented Nov. 1, 1932

1,885,344

UNITED STATES PATENT OFFICE

RICHARD T. GRIFFITHS, OF AKRON, OHIO, ASSIGNOR TO THE B. F. GOODRICH COMPANY, OF NEW YORK, N. Y., A CORPORATION OF NEW YORK

FOUNTAIN PEN

Application filed August 21, 1930. Serial No. 476,955.

The present invention relates to fountain pens and more particularly to the construction of ink sacs of the so-called self-filling fountain pens and to a process of making such sacs.

The ink sacs of fountain pens are normally made of soft vulcanized rubber and when so made present certain disadvantages in use which up to the present time no practical means of overcoming has been devised. Briefly, these disadvantages arise from the fact that the metal actuating mechanism of fountain pens are enclosed in the same chamber with, and in part contact with, the rubber ink sac. It is well known that vulcanized rubber contains an excess of sulfur in an uncombined state and that this free or uncombined sulfur comes to the surface of the rubber, forming thereon what is commonly called "sulfur bloom". There are also slowly given off from the rubber sulfur acids and other sulfur compounds which in the closely confined fountain chamber of the pen attack the metal parts of the filling mechanism causing corrosion, the breaking of pivots and the adhesion of the metal parts to the rubber sacs. Again, certain inks are acid in reaction and the vapors slowly diffusing through the rubber wall of the ink sac also have a corrosive and destructive action on the metal parts.

I have discovered that these disadvantages inherent in fountain pen constructions of the present day may be eliminated by interposing a buffer layer of aluminum or similar metal between the rubber and the metal actuating parts of the pen. I have found by experiment that if the usual rubber sac is given a uniform coherent coating of aluminum powder, that such aluminum enclosure is for all practical purposes impervious to the acid vapors generated within the rubber or within the ink and at the same time prevents the sulfur from migrating from the rubber sac into contact with the metal parts.

In carrying out my invention I preferably form a rubber sac of suitable size and shape in any of the usual ways, as by rolling up a tube from a vulcanizable rubber sheet and then sealing one end of the tube, or by dipping a mold in a rubber cement or aqueous dispersion of rubber so as to build thereon a sac of required dimensions. The aluminum powder may be applied to the sac either before or after vulcanization of the rubber. If the surface of the sac has retained the natural tackiness of rubber, the aluminum powder may be applied directly to the sac, as by rolling the sac in aluminum powder. It may be desirable, however, to increase the surface tack of the rubber before applying the aluminum powder, and this can be done by moistening the surface with an organic solvent or by applying an adhesive material.

Aluminum powder being of scaly flake-like structure effectively sheathes the rubber and in addition serves as an excellent lubricant facilitating the insertion and withdrawal of the sac from the fountain chamber, a most advantageous characteristic when it is considered that the sac normally fits very closely into the barrel of the pen.

An embodiment of my invention is illustrated in the accompanying drawing in which Fig. 1 is a view, partially in section and in elevation, with parts broken away, of the fountain pen and sac of my invention, and Fig. 2 is an enlarged view, partially in section and partially in elevation, with parts broken away, of the sac shown in Fig. 1.

Referring to the drawing, the barrel 10 of the pen has the usual pen plug 11, self filling mechanism 12, and frictionally engaging the reduced inner end portion of the plug 11 a rubber sac 13, all of conventional design and arrangement. The rubber sac 13, as best shown in Fig. 2, is given a tacky surface 14, as by coating with rubber solvent or with an adhesive, and aluminum powder 15 is adhered to the sac 13 in this or other suitable manner.

It is plainly apparent that a fountain pen equipped with the ink sac hereinabove described possesses improved service characteristic of great importance. Whether the aluminum enclosure serves actually to inhibit passage of the sulfur and the acid vapors, or whether the acidic and corroding substances attack the aluminum in preference to the more inactive metals of the filling mechanism and hence are used up, or whether both of these effects contribute to produce the marked advantages obtained by my novel construction, which is the more likely, I am not now prepared to state. The fact is that my new ink sac construction when employed in a self-filling fountain pen remedies the above mentioned defects in prior fountain pen construction, as well as possessing advantageous characteristics not heretofore available, and thus, materially contributes to the long life and uninterrupted service of this indispensable article of every day use.

I claim:

1. In combination, a fountain pen comprising a fountain chamber having metallic actuating mechanism and a vulcanized soft rubber ink sac in said chamber coated with aluminum powder.

2. In combination, a fountain pen comprising a fountain chamber having a vulcanized soft rubber ink sac therein, metallic parts in said chamber cooperating with the sac for effecting the filling thereof with ink, said sac being coated with aluminum powder to protect the said metal parts from the action of corrosive substances of the rubber.

3. As an article of manufacture, a fountain pen sac comprising a pouch of vulcanized soft rubber and a coating of aluminum powder covering the exterior surface thereof.

4. As an article of manufacture, a fountain pen sac comprising a pouch of vulcanized soft rubber and a closely adherent coating of aluminum powder covering the exterior surface thereof.

In witness whereof I have hereunto set my hand this 13th day of August, 1930.

RICHARD T. GRIFFITHS.